United States Patent Office 2,790,994
Patented May 7, 1957

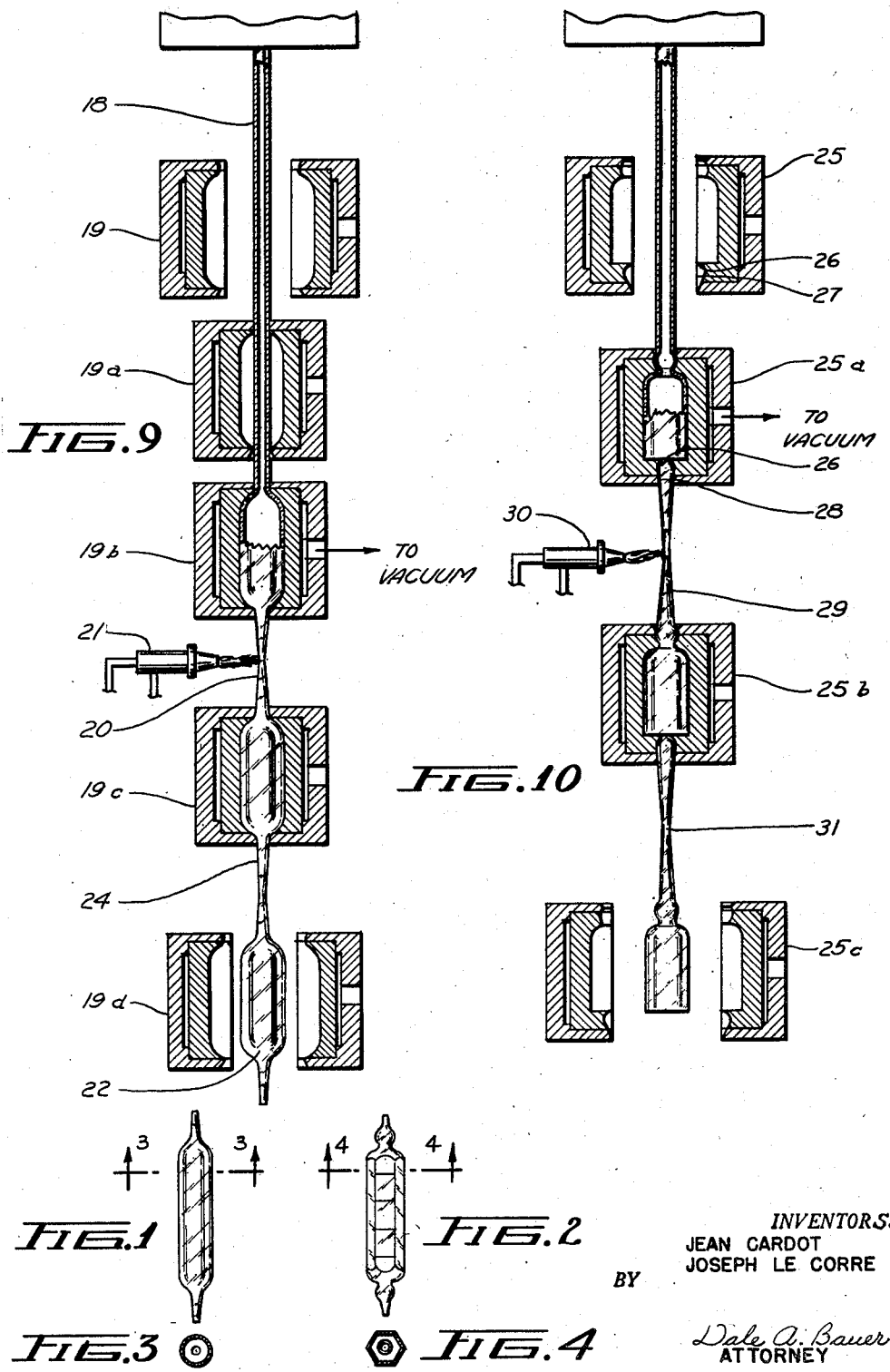

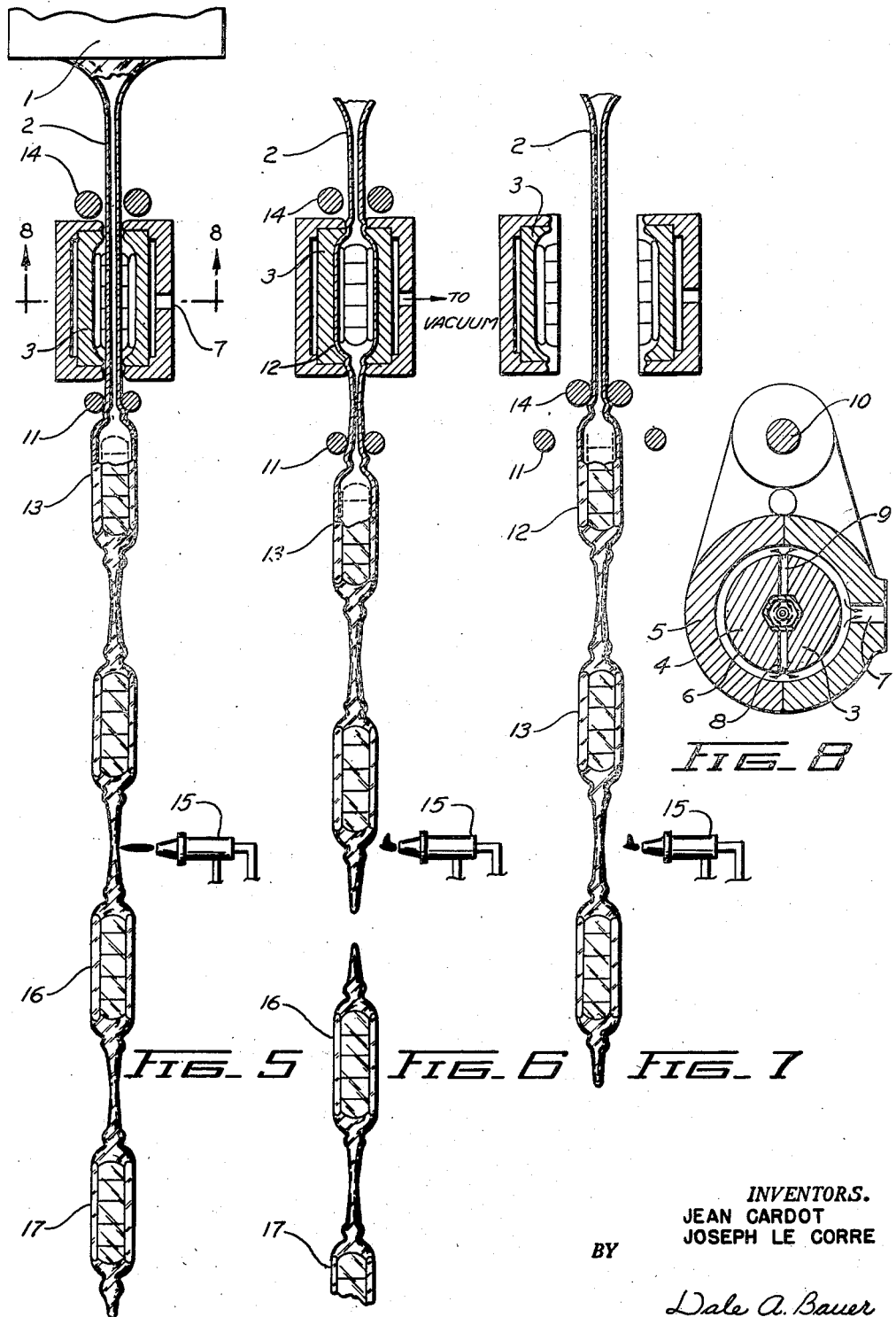

2,790,994

FORMATION OF HOLLOW ARTICLES

Jean Cardot, Orleans, and Joseph Le Corre, Paris, France, assignors to Societe Anonyme des Manufactures des Glaces et Produits Chimiques de Saint-Gobain, Chauny & Cirey, Paris, France Application January 19, 1952, Serial No. 267,273

Claims priority, application France January 23, 1951

10 Claims. (Cl. 18—5)

This invention relates to the making of hollow objects from plastic materials and particularly from thermoplastic materials. Thermoplastic materials of inorganic type include glass and thermoplastic materials of organic type include plastics, such as vinyl chloride, cellulose acetate and the like. The hollow articles which can be made by the new process include such things as bottles, flasks, and ampules for pharmaceutical products. The foregoing listing of particular members of the classes is illustrative and not a limitation.

It has heretofore been proposed to make such objects by molding them by internally applied gas pressure within a mold, sometimes internally applied liquid pressure has been employed for this purpose. The use of a fluid under pressure has raised a technical problem which has been attacked in several ways. In some cases a nozzle containing fluid under pressure has been inserted at one end of a tubular element which is in a plastic state and which has been expanded against the walls of a mould, the other end being closed. In other cases, the plastic tube has been closed at both extremities and the fluid under pressure has been injected into the interior of the closed tube by piercing it with an injection needle. These processes are generally individual, and are carried out upon lengths of the material which are about equal to what is desired in the finished article and the whole of which is enclosed within a mold capable of supporting the fluid pressures applied.

It is an object of this invention to produce such hollow articles from plastic, and preferably from thermoplastic materials, by forming these objects out of successive lengths of a continuous tube, each successive article, or chain of several communicating successive hollow articles, being separated from the tube after formation.

Another object of the invention is to sterilize such hollow objects and to seal them as they are formed.

Another object of the invention is to form sealed, sterile hollow objects which can be unsealed at the moment of filling and immediately sealed thereafter.

Another object is to form a tube of material in a plastic state by extrusion or by other tube forming processes and while the tube is still in a plastic state to shape successive lengths by molding to a preselected form embodied in the mold, to shape and, if desired, seal the ends of the molded shape as desired, thus providing a continuous process of manufacture.

A further object of the invention is to construct apparatus capable of carrying out the method.

The objects of the invention, as applied to the method, are accomplished generally speaking by making hollow articles continuously by extruding a thermoplastic tube in a plastic state, while admitting air at normal pressure to the inside and outside of the tube, enclosing the length of the tube in a mold having room for expansion of the tube, and expanding said length of the tube against the wall of the mold by evacuating the mold.

The means and method by which the other objects of the invention are accomplished will be apparent from a consideration of the following portion of the specification which is set forth as exemplary.

Thermoplastic materials are those which are plastic at elevated temperatures, and while the invention is particularly adapted to the formation of articles from such material, it is also adapted to the formation of articles which are plastic at normal temperature, although it will be understood that such articles will be more liable to distortion by handling than the thermoplastic articles which are hardened, preferably, before they are withdrawn from the mold, or at least before they are handled.

The former processes hereinabove referred to had the disadvantage that they required the use of comparatively complex machinery and apparatus, and an advantage of the present invention is that simple machinery is capable of utilization.

The above and further objects and novel features of the present invention will more fully appear from the following detailed description when the same is read in connection with the accompanying drawings. It is to be expressly understood, however, that the drawings are for the purpose of illustration only and are not intended as a definition of the limits of the invention, reference for this latter purpose being had primarily to the appended claims.

In the drawings, wherein like reference characters refer to like parts throughout the several views, Fig. 1 shows the standard form of a two-pointed ampule such as is employed to hold dosages of pharmaceuticals;

Fig. 2 shows the form of a new type of ampule such as is manufactured by the new process. The formation of such ampules is another object of this invention;

Figs. 3 and 4 are transverse sections, respectively, through Figs. 1 and 2,

Figs. 5, 6 and 7 show three successive steps in the manufacture of glass ampules, or of ampules made of plastics, by the novel process of this invention;

Fig. 8 shows a transverse section through a mold of the type employed for the manufacture of hollow articles;

Figs. 9 and 10 show alternative apparatus and a modified method which is particularly valuable when employed with thermoplastic plastics such as polyethylene or polyvinyl chloride.

The pharmaceutic ampules will be employed in this specification for the purpose of demonsrating the invention as applied to glass, and small thermoplastic bottles will be employed to demonstrate the invention as applied to plastics.

The pharmaceutical ampules made of glass which have heretofore been made generally have the form represented in Figs. 1 and 3, they are made from a short tube of glass of which the extremities are drawn out to form the points of the ampule. They constitute a cylindrical body having the diameter of the original tube and at each end have a relatively long and conical point. In manufacturing such ampules the tube is taken from stock, subjected to vigorous cleaning and then heated at its ends and drawn out to form the ampule. In such cases the form of the ampule is substantially the same as the form of the original tube and its wall thickness except at the ends, is unchanged.

By means of the invention, as shown in Figs. 5, 6 and 7, an apparatus 1, supplied with glass in a thermoplastic state, extrudes a continuous tube 2 at a temperature at which the tube is sufficiently plastic to be readily molded. This molding temperature will vary according to the type of glass being used, but temperatures on the order of 600 to 800° C. are sometimes employed and give an idea of the general range of temperatures that are useful, which will be well understood by persons skilled in the glassmaking industry. The interior of the tube is maintained open to the atmosphere so that the tube is under atmospheric pressure internally. The tube is also under atmospheric pressure externally.

As the tube 2 is extruded it enters into the halves of a mold 3, the construction of which is readily comprehended from the drawings. The mold is in two interfitting parts, having an interior construction corresponding to the shape of the ampule which it is desired to produce. Each half of the mold is comprised of a shell 4 and of a jacket 5 separated by an annular space 6 which can be put in communication with a source of vacuum, which is not represented being of any ordinary or desired type. An orifice 7 in the side of the jacket permits a nozzle connected with the source of vacuum to be applied to the mold and to evacuate it. The vacuum communicates with the interior 8 of the mold by a loose fit 9 which exists between the two shells. The two halves of the mold pivot about a common center 10, in opposite directions.

Fig. 5 represents the initial phase of the manufacture of an ampule at the instant when the mold 3 is closed upon the glass tube 2, which is still plastic. The mold is closed upon the tube with sufficient tightness to permit the formation of a substantial vacuum within the mold about the tube. An ampule 13 has just been formed, and a pair of fingers 11 make contact with the upper portion of that ampule after the mold 3 has closed upon the section of the tube thereabove.

In Fig. 6 is shown the next step of the operation, in which a vacuum has been established between the glass and the mold and the difference in pressure between the atmospheric pressure inside the tube and the vacuum outside it has caused the tube to be distended and to conform itself to the shape of the mold. At the same time, the fingers 11 have been moved downwardly away from the mold thus elongating the tube between the top of ampule 13 and the bottom of ampule 12.

A third step of the process is shown in Fig. 7, where the mold has been opened by pivoting the halves in opposite directions around the shaft 10, the fingers 11 have opened, and a second pair of fingers 14, which were first above the mold, have made contact with the top of the ampule 12 which has just been formed; these fingers 14 then move the ampule 12 downward and draw a new portion of the tube issuing from the apparatus 1 into the space between the house of the mold. The pairs of fingers 11 and 14 then return to the positions which they occupied in Fig. 5 and the series of operations is begun again.

The ampules are thin and they harden rapidly after they are withdrawn from the mold.

The ampules thus molded form a chain and the individual ampules may be separated from each other by means of a blow pipe cutter 15 which is directed upon the reduced portion where the points of adjoining ampules are connected. At the same time that it melts and separates the glass, the blow pipe seals the ampule and sterilizes the interior by means of the heat thus supplied. This sterilization is not necessary in the case of glass which has already been sterilized by the temperature at which the glass is extruded, but it is very valuable in the case of thermoplastic materials which are not heated at high temperatures. The interior of the ampule, thus sealed, is in a perfect state of sterilization and is so kept until it is filled. As shown in Fig. 6, the blow pipe is turned low after it has accomplished the separation of two ampules, thus saving gas and preventing an impairment of the ampule itself. In order that the filling of the ampules may be accomplished simply, they are cut apart two by two as indicated in Figs. 5 and 6, the two being interconnected by the conjoined tips, which can be easily broken apart at the thinnest point, filled with the material, and then sealed by means of a blow pipe. No sterilization is necessary and this is a great advantage of this invention.

In the modification shown in Fig. 9, fingers are eliminated and the molds themselves move with the tube. This particular example is directed to the use of organic plastics in order to illustrate the application of the invention to such materials. In this figure, the tube 18, still soft, and in communication with the atmosphere inside and outside, is engaged as it is extruded between the two halves of a mold 19 similar to the type shown in Fig. 8 of which the successive positions are shown at 19a, 19b, 19c and 19d. In this form of the invention a series of molds is employed one after the other and they accompany the plastic tube from its extrusion.

In other words, after the mold 19 has left one position, that position is approached by another mold progressing in the same way and passing through the same cycle of operation. The mold 19 moves with the plastic tube as it is extruded, and moves at substantially the same speed until it reaches position 19a, where it closes on the tube while continuing to move at the same speed. When the mold reaches position 19b, the interior is connected with a vacuum pump through port 7 and the portion of the tube is then expanded against the wall of the mold. After this, the mold is moved at a speed faster than that with which the tube is extruded, drawing out the part 20 of the tube emerging from the lower part of the mold so that the lower point of each ampule is formed when the mold is at position 19b, and the upper point when it is at 19c. A blow pipe 21 permits the reheating of the thermoplastic tube at the point where it is to be drawn out. The mold then passes to the position 19d where it opens, releasing the finished ampule 22 which can then be separated at 24 from the tube.

In the example of Fig. 10, which concerns the manufacture of ampules or little bottles with flat bottoms, the mold 25, generally similar to that described above, is provided with cavities 27, in each part, which are bulb shaped when joined and provide the mold with a grip upon the tube additional to that upon the body of the ampule and impart something of design to the bottle. At the bottom, the cooperating edges 26 of the mold constitute pincers which cut the bottle from the depending part of the tube, but the depending part is held by the bulbous recess 28 in the bottom of the mold. Vacuum is applied at position 25a, forming the bottle out of the tube and the pincers constitute a flat bottom to which the bottle conforms itself by the action of the vacuum. Thereafter, the mold is further displaced from position 25a to 25b with speed superior to that of the tube so that an extension and reduction in section occurs in the tube between the bottle at 25a and 25b. A blow pipe 30 may be used to aid the drawing out of the tube, if desired.

At the subsequent position 25c, the mold opens, the ampule is separated at 31 by scissors or the like, or by a blow pipe, while the short section of tube depending from the lower bulb in the mold drops off. It should be understood that the process can be carried out not only downward, but in any direction, although it is advisable to employ a vertical line of movement when the material of the tube is sufficiently plastic to be deformed by gravity when moved horizontally.

It is possible, by the method of the invention, to make hollow glass articles of different forms, and of selected wall thickness and to make them continuously from a moving plastic tube. The body of the ampule need not be cylindrical but can be of any shape capable of being removed from the mold. The points of the bodies may be extremely fine or quite large and they may be short or long, depending upon the degree of extension. The ordinary form in Figs. 1 and 3 may be abandoned in favor of shapes better suited to the content, to the needs of packing, or to the requirements of strength. As the appearance of bottles is extremely important in some industries, this invention makes it possible to prepare hollow glass objects continuously with the finest of designs.

Moreover it is possible by the method of the invention to make a series of several communicating successive hollow articles, as ampules for pharmaceutical products, so that the filling of several ampules may be accomplished simply at once.

As many apparently widely different embodiments of the present invention may be made without departing from the spirit and scope thereof, it is to be understood that the invention is not limited to the specific embodiments.

What is claimed is:

1. The method of making hollow articles continuously that comprises extruding a thermoplastic tube in a plastic state, admitting air at normal pressure to the inside and outside of the tube, enclosing a length of the tube in a mold having room for expansion of the tube, said mold being closed about the tube at both ends of said length, expanding said length of said tube against the wall of the mold by evacuating the mold, enclosing another length of the tube in a mold and expanding it by evacuation of the mold, elongating and reducing the section of the tube between said expanded parts of said tube and on both sides of said expanded parts, by drawing it while it is still in a plastic state, severing and sealing the reduced sections of the tube on opposite ends of each pair of molded lengths by means comprising heat of sterilizing degree and hardening each molded section of the tube after it has been expanded to the shape of the mold.

2. The method of making hollow articles continuously that comprises extruding a tube in a plastic state, admitting air at normal pressure to the inside and outside of the tube, enclosing a length of the tube in a mold having room for expansion of the tube, said mold being closed about the tube at both ends of said length, expanding said length of said tube against the wall of the mold by evacuating the mold, elongating and reducing the section of the tube between expanded parts of said tube by drawing it while it is still in a plastic state, severing and sealing the reduced section of the tube between each pair of molded lengths by means comprising heat, and hardening each molded section of the tube after it has been expanded to the shape of the mold.

3. The method of making hollow articles continuously that comprises extruding a tube in a plastic state, admitting air at normal pressure to the inside of the tube, enclosing a length of the tube in a mold having room for expansion of the tube, expanding said length of said tube against the wall of the mold by evacuating the mold, similarly enclosing and expanding additional spaced lengths of the tube, elongating and reducing the sections of the tube between the expanded lengths while said sections are in a plastic state, and severing a hollow article from the tube.

4. Apparatus for the manufacture of a series of hollow shapes from a thermoplastic tube in a plastic state which comprises means to form a plastic tube, said tube being exposed to equal inside and outside pressure, a split mold having room, when closed, for expansion of the tube, means to close the mold about a length of the tube, means to evacuate the mold, means to move the mold at the same speed as the tube, and means to elongate and reduce the section of the tube beyond the mold.

5. The method of making ampules which comprises extruding a tube in a plastic state, successively expanding spaced lengths of said tube into hollow articles, successively elongating and reducing the sections of the tube between successive hollow articles while each said section is in a plastic state, and sealing the ends of the tube outside said hollow articles by closing the tube at the reduced sections.

6. The method of making hollow shapes in sequence along the length of a moving tube that comprises continuously extruding a thermoplastic tube at plastic temperature, applying vacuum to a length of the exterior thereof and thereby expanding said length of the tube into a hollow article, maintaining the pressure differential between the inside and outside of the tube at not less than the value initially established during the said expansion, thereafter similarly expanding lengths of additional adjacent sections of the tube into hollow articles, drawing out the portions of the tube between said articles while said portions are in a plastic state to thereby elongate and reduce said portions, and sealing and severing a plurality of such reduced portions of the tube whereby to form a hollow object sealed at both ends.

7. A method as defined in claim 6 wherein the sealing and severing of said reduced portions are effected by a flame.

8. The method of making hollow articles continuously that comprises extruding a thermoplastic tube in a plastic state, admitting air at normal pressure to the inside and outside of the tube, successively enclosing each of a plurality of spaced lengths of the tube in a mold having room for expansion of the tube, said mold being closed about the tube at both ends of each said length, expanding each said enclosed length of said tube against the wall of the mold by evacuating the mold, elongating and reducing each section of the tube between successive expanded lengths thereof and at both ends of said plurality of expanded lengths by drawing each said section while it is still in a plastic state, severing and sealing the reduced sections of the tube at opposite ends of said plurality of molded lengths by means comprising heat, and hardening each molded length of the tube after it has been expanded to the shape of the mold.

9. The method of making hollow articles continuously that comprises extruding a tube in a plastic state, admitting air at normal pressure to the inside of the tube, successively enclosing spaced lengths of the tube in a succession of spaced molds having room therein for expansion of said lengths of the tube enclosed thereby, expanding each said length of the tube against the wall of the mold enclosing the same by evacuating the mold, elongating and reducing the sections of the tube between the expanded lengths by moving successive molds relative to each other after the expansion of said lengths therein to draw each said section while the same is in a plastic state, and severing a hollow article from the tube.

10. Apparatus as defined in claim 4 comprising means to sever molded shapes from each other and from the tube.

References Cited in the file of this patent

UNITED STATES PATENTS

| | | |
|---|---|---|
| 1,259,964 | Davis | Mar. 19, 1918 |
| 1,892,126 | Bailey | Dec. 27, 1932 |
| 1,981,636 | Soubier | Nov. 20, 1934 |
| 2,175,365 | Saffir | Oct. 10, 1939 |
| 2,326,041 | Lavallee | Aug. 3, 1943 |
| 2,379,342 | Cozzoli | June 26, 1945 |
| 2,486,759 | Pfeiffer | Nov. 1, 1949 |
| 2,493,439 | Braund | Jan. 3, 1950 |
| 2,501,833 | Webb et al. | Mar. 28, 1950 |
| 2,541,249 | Hobson | Feb. 13, 1951 |
| 2,579,390 | Mills | Dec. 18, 1951 |

OTHER REFERENCES

"Scientific and Industrial Glass Blowing and Laboratory Techniques," by Barr and Anhorn, Instruments Publishing Co., Pittsburgh, Pa., 1949, page 64.